United States Patent
Chen et al.

(10) Patent No.: US 8,269,955 B2
(45) Date of Patent: Sep. 18, 2012

(54) MULTI-PATH INTERFERENCE PERFORMANCE TESTING

(75) Inventors: David Zhi Chen, Richardson, TX (US); Mark A. Ali, Cockeysville, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 437 days.

(21) Appl. No.: 12/570,991

(22) Filed: Sep. 30, 2009

(65) Prior Publication Data

US 2011/0075129 A1    Mar. 31, 2011

(51) Int. Cl.
*G01N 21/00* (2006.01)
(52) U.S. Cl. .................... 356/73.1; 356/365
(58) Field of Classification Search ............ 356/477, 356/491, 370, 365, 368, 73.1
See application file for complete search history.

(56) References Cited

U.S. PATENT DOCUMENTS

| | | | |
|---|---|---|---|
| 2006/0038999 A1* | 2/2006 | Hentschel et al. | 356/364 |
| 2008/0068607 A1* | 3/2008 | Lecoeuche | 356/365 |
| 2009/0135409 A1* | 5/2009 | Ruchet et al. | 356/73.1 |
| 2010/0073667 A1* | 3/2010 | Cyr et al. | 356/73.1 |

* cited by examiner

*Primary Examiner* — Taifur Chowdhury
*Assistant Examiner* — Jonathan Hansen

(57) ABSTRACT

A system comprises a laser configured to produce a laser beam and to be optically coupled to a first end of an optical fiber of a device under test, a phase mask configured to selectively pass one of a plurality of modes and to be optically coupled to a second end of the optical fiber of the device under test, and a detector optically coupled to the phase mask and configured to determine an intensity of the beam received over the optical connection from the phase mask. The system may further comprise a data analyzer connected to the detector and in selective communication with the phase mask, wherein the data analyzer is configured to set the phase mask to selectively pass a fundamental mode, set the phase mask to selectively pass a higher order mode, receive intensity data from the detector, and determine a performance in the form of at least one performance factor for said device under test according to said intensity data.

20 Claims, 3 Drawing Sheets

MULTI-PATH INTERFERENCE PERFORMANCE TESTING

BACKGROUND

Compared to metal wires, optical fibers have superior signal capacity and immunity to electromagnetic interference. Accordingly, optical fibers are increasingly being used for exterior wiring, such as between networking installations of a communications provider. Moreover, increasing bandwidth requirements for businesses and consumers has justified fiber penetration into customer premises, including commercial buildings and living units. Fiber to the premises (FTTP) is a term for an optical networking architecture in which optical fiber, rather than a metal loop, is used for the final leg of connectivity delivery from a communications provider to a customer premises, such as a multiple dwelling units (MDUs).

When optical fiber is pulled into a customer premises, the fiber may be twisted, bent, spliced, and stapled in order for the fiber to be routed to its destination. New types of optical fiber with minimum bend radii of <5.0 mm, known as bend-insensitive fiber, have been created that are more resistant to high losses from the bending that may occur during installation. However, these new types of fibers may be more susceptible to multi-path interference (MPI) caused by physical discontinuities. Accordingly, even with bend-insensitive fibers with $R_B$<5.0 mm, it may be desirable to test the performance of the optical fiber to determine the best possible performance over the entire length fiber.

DETAILED DESCRIPTION

New types of fiber have been designed to improve fiber bend performance, to meet various networking requirements, and also to be compatible with large-scale manufacturing and installation procedures. Specifically, bend-improved, bend-tolerant, bend-resistant, bend-impervious and bend-insensitive grades of bend-insensitive fiber have been developed to produce optical fibers that may be bendable to a greater degree than standard single mode fiber compliant to a standard known as ITU-T rec. G.652.D from the International Telecommunication Union. The indicated standard is incorporated herein in its entirety. These new bend-insensitive fibers may overcome issues with standard single mode fiber that can suffer complete loss when bent around a corner with a 5 millimeter (mm) radius. Due to their increased bend tolerance, bend-insensitive fibers may allow for relatively easy and quick installation of the fiber within customer premises, such as by way of multiple dwelling units (MDUs), by installation personnel familiar with installation of copper wiring. Customer premises installation may include the installation of distribution hubs, optical connectors, fiber runs through raceways, as well as fusion splicing (e.g., using an electric arc to weld two fiber optic cables together) and/or mechanical splicing.

While bend-insensitive fibers may be more resistant to optical losses due to bending, bend-insensitive fibers may be more susceptible to modal interference because the higher order modes may also have a lower bending loss. One particular type of modal interference is multi-path interference (MPI), which may be defined as a phenomenon whereby a wave from a source travels to a detector via two or more paths and, under the right conditions, the two (or more) components of the wave interfere. For example, MPI may occur when light is scattered into a higher order mode at a relatively high-loss connector or splice. The scattered light may then propagate in the higher order mode to a detector or to another fiber splice, where the higher order mode may then be coupled back into the fundamental mode. The lower and higher order modes may have different propagation characteristics which may cause interference or other noise in the optical signal. Due to the two (or more) modes having each traveled a different length, the different modes may arrive at a detector out of phase with one other, resulting in an interference pattern.

Figure 1:
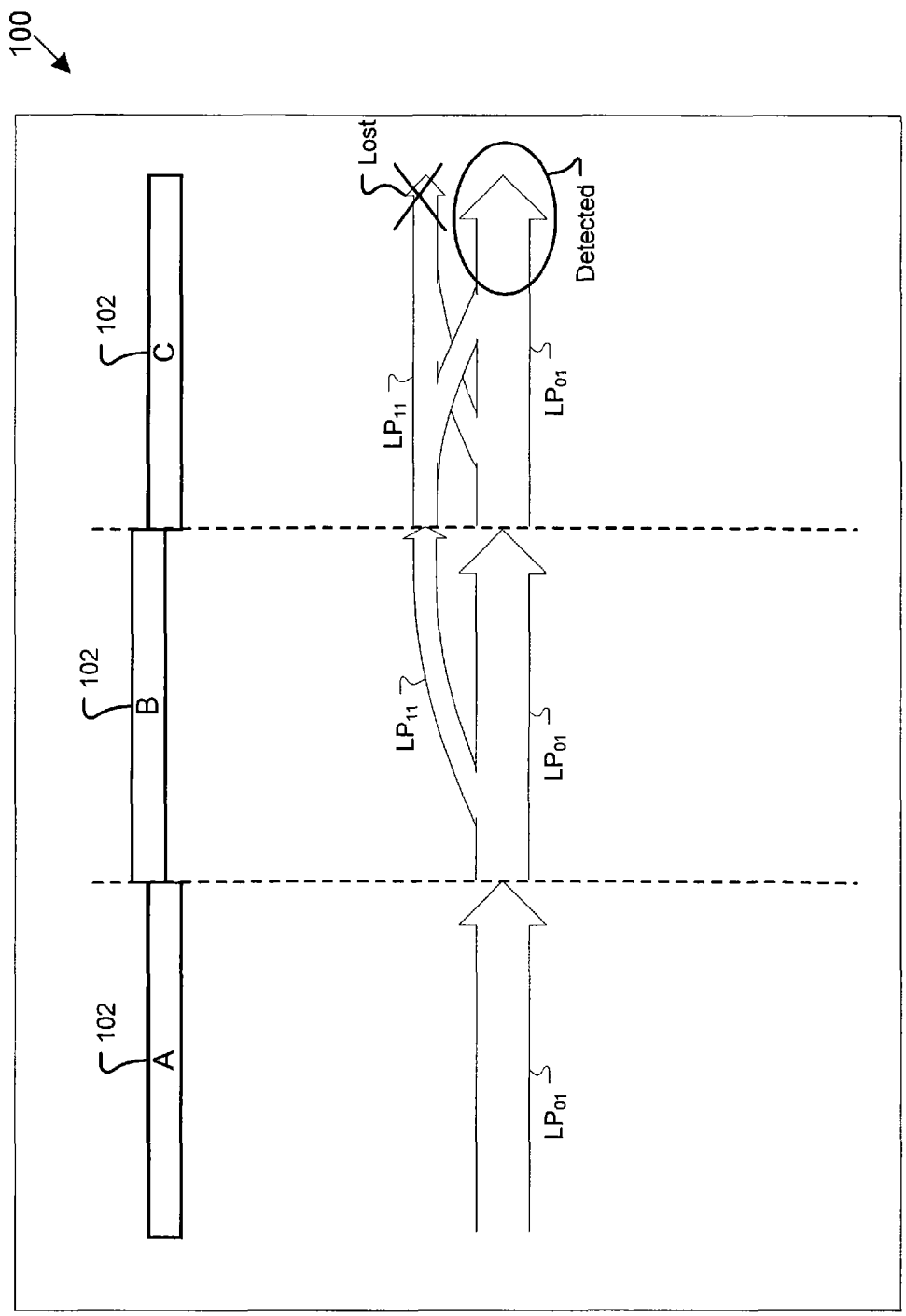
FIG. 1 illustrates an exemplary schematic of a system susceptible to multi-path interference.

FIG. 1 illustrates an exemplary schematic of a system 100 with optic fibers 102 susceptible to MPI. As illustrated, a short fiber jumper 102-B supports both the fundamental linearly polarized (LP) mode $LP_{01}$ and also a higher order mode $LP_{11}$. Short fiber jumper 102-B is coupled (i.e., spliced) between two longer fibers, namely fiber 102-A and fiber 102-C. Accordingly, various wavelengths of light (e.g., 1290 nm and 1550 nm) may travel from fiber 102-A to fiber 102-C over short fiber jumper 102-B. Such a scenario may be found, as an example, in a fiber installation in an MDU.

The splice points between fibers 102-A and 102-C and short fiber jumper 102-B have offsets in the connections, meaning that the core and cladding layers of the fibers 102 are not an exact match. At both the connection from fiber 102-A to fiber 102-B and the connection from fiber 102-B to fiber 102-C, most of the power intensity from the $LP_{01}$ mode of the input fiber 102 is coupled to the $LP_{01}$ mode of the output fiber 102. However, due to the offset at the first connection, some of the light from the $LP_{01}$ mode of fiber 102-A may also be coupled into the $LP_{11}$ mode of the fiber 102-B. This effect may be referred to as multimode leakout.

At the connection from fiber 102-B to fiber 102-C, a portion of the light from the $LP_{11}$ mode of fiber 102-B may be coupled back into the $LP_{01}$ mode of fiber 102-C. This light may interfere with the light in the $LP_{01}$ mode coupled from fiber 102-B to fiber 102-C, thereby causing MPI.

This optical coupling of higher order modes (such as $LP_{11}$) introduces noise into the resultant signal and reduces the transmission efficiency of the fundamental mode (i.e., $LP_{01}$) for the system. Moreover, because the MPI from the higher order modes occurs on the same wavelength as the fundamental mode, MPI may be difficult to filter out in a fiber installation. Therefore, the amount of MPI in the resultant beam may affect the suitability of fiber 102 for various applications.

A fiber 102 that in actuality produces a large amount of MPI in a carried beam may appear to be properly passing signal when a simple decibel (dB) test is performed on the fiber 102. However, such a fiber 102 may be rendered unusable for many applications due to the amount of MPI produced. Accordingly, measuring a performance factor such as the MPI signal-to-noise ratio over a fiber 102 may be beneficial in making a determination of the actual performance that may be achieved over the fiber 102.

The MPI signal-to-noise ratio over a fiber 102 may be calculated by independently measuring the levels of the fundamental and higher order modes traversing the fiber 102. Based on the actual performance of the fiber 102, it may be determined what modulation rates (e.g., rates such as 100

Mbit modulation, 10 Gbit modulation, 40 Gbit modulation by way of example) are in fact useable over the fiber 102 given the amount of MPI noise. The amount of MPI may vary according to laser wavelength and therefore it may be determined that different maximum modulation rates are useable for different wavelengths over the same fiber 102. These determinations may be used to certify a fiber line for use in a particular setup, such as a fiber installation in an MDU, for certification of a type of fiber, to verify proper fiber manufacture, and for determining issues in long haul or submarine fiber lines, among others examples.

It should be noted that as illustrated in FIG. 1, MPI may be caused by multimode leakout from imperfect splice points. MPI may similarly occur due to other disturbances of the optical fiber, including, but not limited to, consecutive small bends of the fiber 102 or multiple instances of stapling down of a fiber 102 located in close proximity. These, and other potential causes of MPI, may be incorporated into test devices that may be used to test for levels of MPI under various circumstances.

Figure 2:
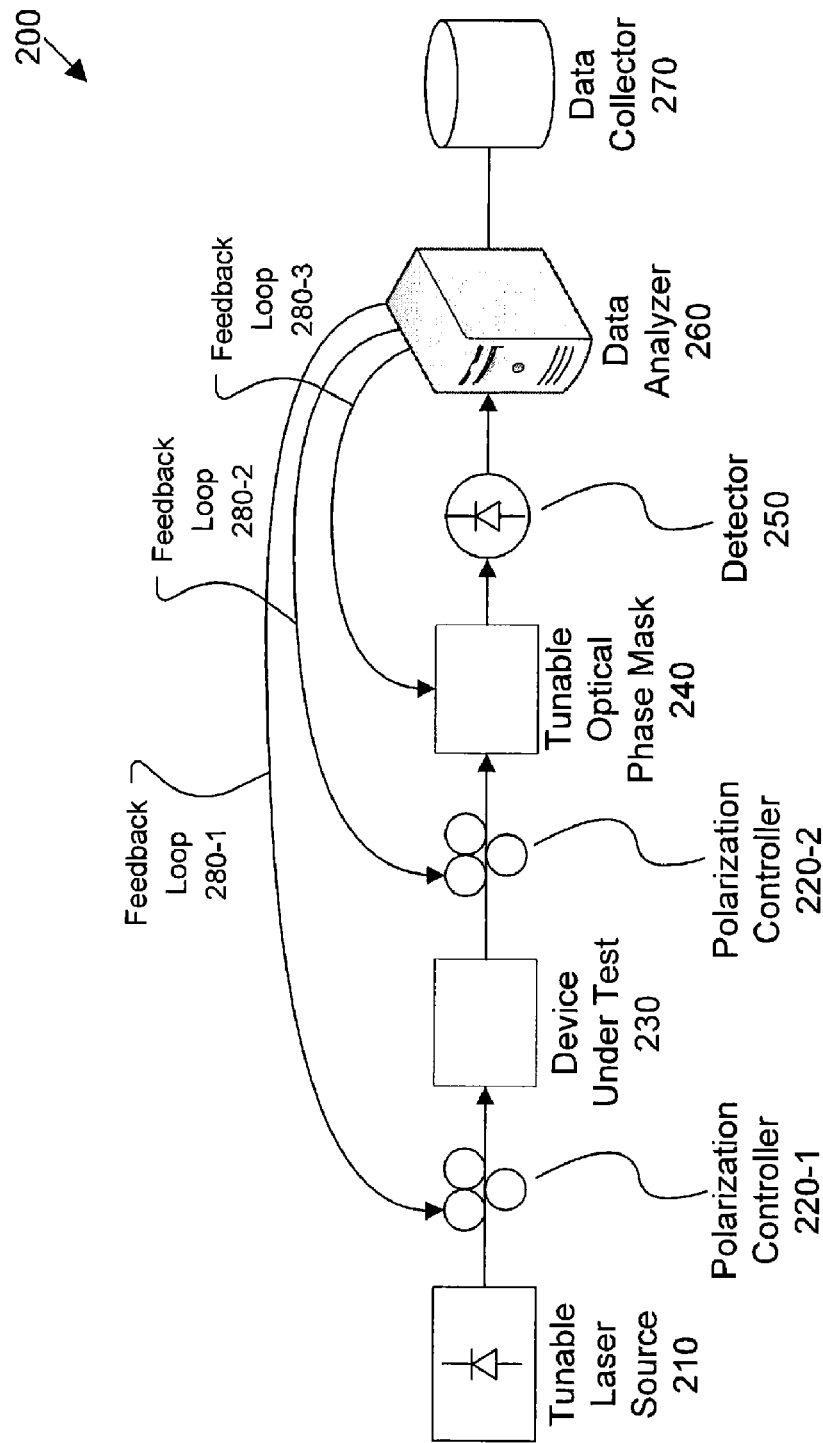
FIG. 2 illustrates an exemplary system for measuring a performance of a device under test accounting for multi-path interference.

FIG. 2 illustrates an exemplary system 200 for measuring a performance such as signal-to-noise of a device under test accounting for MPI. System 200 may take many different forms and include multiple and/or alternate components and facilities. While an exemplary system 200 is shown in FIG. 2, the exemplary components illustrated in figure are not intended to be limiting. Indeed, additional or alternative components and/or implementations may be used.

As shown in the figure, system 200 illustrates a testing setup including a tunable laser source 210 optically connected to a polarization controller 220-1, in turn optically coupled to a device under test (DUT) 230. The DUT 230 is optically coupled to a second polarization controller 220-2, which is in turn optically coupled to a tunable optical phase mask 240, which in turn is optically coupled to a detector 250. The detector 250 is then connected to a data analyzer 260, where the data analyzer 260 is connected through feedback loops 280-1, 280-2, and 280-3 to the first polarization controller 220-1, the second polarization controller 220-2, and also to the tunable optical phase mask 240. The data analyzer 260 is also connected to a data collector 270 for storage. As described in detail below, through use of an exemplary test setup such as that illustrated in system 200, the system may determine the MPI of the DUT 230, the signal-to-noise ratio of the DUT 230, and what modulation rates are achievable over the DUT 230 for a given wavelength.

System 200 includes a tunable laser source 210. A laser is a device that may emit light or other forms of electromagnetic radiation through simulated emission. A laser, such as tunable laser source 210, may provide a spatially-coherent low-divergence beam of light energy for a particular band of wavelengths. Accordingly, tunable laser source 210 may provide a beam of coherent light, and may function as a light source for the system 200. To provide a stable beam for use in testing, tunable laser source 210 may be required in some examples to possess relatively high power stability, such as being capable of maintaining a power level within 0.01 dB over a multiple hour testing period. The source output power stability may be beneficial because the output power stability may define the dynamic range of the test setup.

Tunable laser source 210 may further be capable of tuning the laser output within a range or set of possible wavelengths. Exemplary wavelengths include 1310 nanometers (nm), 1490 nm, 1550 nm, and 1625 nm, among others. For example, the tunable laser source 210 may be configured to produce output at a wavelength of 1550 nm.

In some instances, a single wavelength laser may be used in place of tunable laser source 210 if measurement over a single wavelength is sufficient. In still other instances, a bank of lasers, each turned to a particular wavelength, may be used instead of or in addition to tunable laser source 210.

A polarization controller 220-1 may be optically coupled to the tunable laser source 210. In many instances, the beam exiting from tunable laser source 210 is not polarized. In contrast, the beam received from tunable laser source 210 may include two orthogonal degenerate components. These two orthogonal modes may be linearly independent, but of the same wavelength. The polarization controller 220-1 may be used to isolate one of the two orthogonal components, allowing for each to be used independently.

In addition to isolating the degenerate components, the polarization controller 220-1 may be used to deterministically create various states of polarization from the initial input polarization state (or lack of polarization). Generally, the state of polarization of an electromagnetic wave can be described by the amplitude and phase relationship between two orthogonal linear vectors at right angles to the propagation direction. As one example of a polarization controller 220-1, the state of polarization may be manipulated through a set of included waveplates, sometimes referred to as retardation plates. Each waveplate may consist of a birefringent material (such as quartz), and may be selectively oriented such that incident polarized light may be resolved into two components. These two components may accordingly experience a relative phase shift proportional to the thickness of the waveplate. Thus, the waveplates may alter the phase difference between the two components as they propagate, which when recombined produces another state of polarization. Accordingly, this relative phase shift, or retardation, may allow the waveplates of the polarization controller 220-1 to transform polarizations from one state to another.

A desired state of polarization to be output may be described through various techniques, such as through azimuth and ellipticity parameters, Stokes values corresponding to a desired state of polarization, or through a graphical definition as a point on a Poincaré sphere model. The description may be input into or otherwise selected by the polarization controller 220-1 to specify a particular polarization to be imparted on the beam inputted to the polarization controller 220-1. For example, the polarization controller 220-1 may receive input and be controlled over feedback loop 280-1 by data analyzer 260, as discussed in more detail below.

In some instances, a polarization controller 220-1 may include an auto-scanning feature, through which the polarization controller 220-1 may continuously sweep over at least a subset of the states of polarization. For example, the polarization controller 220-1 may use an auto-scanning feature to sweep the state of polarization across the entire Poincare sphere. A sweep may be used, for example, to determine which of a range of states of polarization may produce a preferred result.

One end of a DUT 230 may be optically coupled to the polarization controller 220-1. The DUT 230 may be optically coupled to the system 200 to allow for the MPI of the DUT 230 to be characterized. It should be noted that the DUT 230 is not a specific device or even a specific type of device. Rather, DUT 230 is instead a device that is under test by the system 200.

In some cases, exemplary DUTs 230 may be designed to attempt to mimic field installation conditions for optical fiber 102. More specifically, the DUT 230 may be an optical fiber under one or more forms of stress, including but not limited to stresses caused through use of component connectors, splices, staples, and bends. Exemplary DUTs 230 may thus incorporate stresses that produce issues similar those that may be encountered by installed fiber 102. For example, a DUT 230 may include an optical fiber affixed to a base using multiple flat head staples (such as twenty staples). As another example, a DUT 230 may include loops and/or sharp turns (such as 90 degree turns) over tight bend radii (such as 5 mm). As yet another example, a DUT 230 may incorporate one or more misaligned splices similar to as discussed above with regard to FIG. 1. In still other cases, the DUT 230 may be an installed line of fiber 102, such as a pulled fiber in a MDU or a portion of a submarine cable installation.

A second polarization controller 220-2 may be optically coupled to the far end of the DUT 230. In some cases, the DUT 230 may affect the polarization of the beam traversing the DUT 230. In cases such as these, polarization controller 220-2 may sweep over the states of polarization to determine the polarization of the beam exiting the DUT 230, and to adjust the determined state of polarization based on the determined input polarization state. Accordingly, polarization controller 220-2 may be instructed to perform a particular polarization to readjust the beam received from DUT 230. The particular settings for polarization controller 220-2 may be received over a feedback loop 280-2 from data analyzer 260, as discussed in more detail below.

A tunable optical phase mask 240 may be optically coupled to the polarization controller 220-2, such as through use of an optical alignment telescope. Generally, each mode (such as the $LP_{01}$ and $LP_{11}$ modes discussed above) has a unique particular pattern of intensity distribution within the fiber 102. These mode intensity patterns may be referred to according to integral values of radial and angular mode in the form $LP_{nm}$, where n in the azimuthal or angular mode number and m is the radial mode number (e.g., $LP_{01}$, $LP_{11}$, etc.). Depending on the individual mode m and n, different areas in an optical fiber may accumulate intensity or may not accumulate intensity. For example, when considered as a cross-section of the fiber 102, the fundamental mode may appear as a circle of intensity in the middle of a fiber, while other modes may appear, for example, as multiple round ovals, or as concentric rings.

Because these patterns of intensity are unique for each mode and wavelength and are able to be computed, a tunable optical phase mask 240 filter may be configured that substantially matches the pattern of intensity for a particular mode. The phase mask may be designed to allow through light substantially only according to the unique intensity pattern for the particular mode for which it is designed. Through use of a phase mask that substantially matches the intensity distribution for the mode field of distribution, the phase mask may be used to filter out essentially all but a single mode, preventing the passage of other unnecessary or unwanted modes. Thus, a phase mask may be designed that selectively allows essentially only a chosen mode to pass.

In some examples, tunable optical phase mask 240 may be constructed of a liquid crystal, a multi-dimensional liquid crystal, a micro electro mechanical system (MEMS), or a multi-dimensional lens specifically designed to exactly match a desired the specified mode pattern. Accordingly, a proper pattern to pass an indicated mode may be configured through the selective setting of individual pixels or mirrors according to the design of the utilized phase mask. A computerized model of a specific mode may be used to facilitate the setting of the proper pattern.

Accordingly, tunable optical phase mask 240 may be used to select for a specific mode out of the modes propagated over the DUT 230. The tunable optical phase mask 240 may further be tuned to change the parameters of the desired mode to better match the input beam, and to selectively switch from passing one of a plurality of modes to passing another mode that the tunable optical phase mask 240 is capable of selectively passing. Thus, tunable optical phase mask 240 may be used to filter out unwanted modes, and to pass only a desired mode. Moreover, the particular settings for the tunable optical phase mask 240 may be received and/or optimized over a feedback loop 280-3 from data analyzer 260, discussed in more detail below. It should be noted that it is possible in some instances for fixed phase masks that are not tunable to be used to filter out unwanted modes.

While as illustrated DUT 230 is shown as being connected between polarization controller 220-1 and polarization controller 220-2, in other exemplary systems the DUT 230 may be connected between tunable laser source 210 and tunable optical phase mask 240 without polarization controllers 220-1 and 220-2.

A detector 250 may be optically coupled to the tunable optical phase mask 240. The detector 250 may be an instrument or other device capable of receiving a beam and of determining the level of power of the received beam. Detector 250 may provide an output signal to another device, where the output from the detector 250 includes information such as data regarding the intensity of the input beam.

Data analyzer 260 may be a computing device configured to receive and analyze test information from the detector 250. Data analyzer 260 may further be configured to select test parameters for the tunable laser source 210, the tunable optical phase mask 240, and the polarization controllers 220-1 and 220-2. The test parameters selected by the data analyzer 260 may include a specific mode (e.g., fundamental mode or a higher order mode), a specific wavelength (e.g., 1550 nm), and a specific polarization state used to perform at least a portion of an MPI test of the DUT 230. These test parameters may be varied between test runs to test various aspects of MPI over the DUT 230. The results of these varied tests may be analyzed by the data analyzer 260 to characterize the DUT 230.

In addition to varying the test parameters between test runs, through feedback loops 280-1, 280-2 and 280-3, test parameters may be varied and improved. Polarization controller 220-1 may be in selective communication with the data analyzer 260 over a connection such as feedback loop 280-1, and polarization controller 220-2 may be in selective communication with the data analyzer 260 over a connection such as feedback loop 280-2. Through use of the feedback loops 280-1 and 280-2, the polarization controllers 220-1 and 220-2 may be further configured to receive and execute directives from the data analyzer 260. For example, through use of the feedback loop 280-1, polarization controller 220-1 may be further configured to receive and execute directives from the data analyzer 260 to better match the properties of the beam to input to the DUT 230. As another example, through use of the feedback loop 280-2, polarization controller 220-2 may be further configured to receive and execute directives from the data analyzer 260 to better match the properties of the beam output from the DUT 230. These parameters may require adjustment because the DUT 230 may alter the polarization of the beam traversing the DUT 230.

Additionally, tunable optical phase mask 240 may be in selective communication with data analyzer 260, and may be configured to receive and execute directives from the data analyzer 260 over a connection such as feedback loop 280-3. For example, directives may be sent from data analyzer 260 to tunable optical phase mask 240 over feedback loop 280-3, and may indicate to the tunable optical phase mask 240 to select from a plurality of modes or to tune the particular settings of a particular mode to pass. More specifically, data analyzer 260 may be configured to perform Fast-Fourier Transform (FFT) analysis on the data received from detector 250. The FFT analysis may be performed to determine a resonance frequency, where the resonance frequency may be based on the particular mode being passed or blocked by the tunable optical phase mask 240. The FFT analysis may accordingly determine an analysis result indicative of an undesired mode being passed by the tunable optical phase mask 240 in addition to the mode the tunable optical phase mask 240 is being set to selectively pass. Additionally, a directive may be sent to the tunable optical phase mask 240 over a connection, such as feedback loop 280-3, to adjust the particular settings of the tunable optical phase mask 240 to minimize the resonance frequency peak indicative of the undesired mode.

As an example, the tunable optical phase mask 240 may be used to filter out the fundamental modes and pass a higher order mode. However, based on the FFT results, data analyzer 260 may determine that while some portion of the fundamental mode is being filtered out by the tunable optical phase mask 240, a substantial portion of the fundamental mode still remains in the beam. This portion of the fundamental mode may be identified as a particular peak in the FFT representative of the fundamental mode. Data analyzer 260 may accordingly use feedback loop 280-3 to send directives to the tunable optical phase mask 240 and adjust the settings of tunable optical phase mask 240. Based on the adjustments, the data analyzer 260 may determine whether the new result has a greater or lesser peak for the fundamental mode. Through this process the data analyzer 260 may accordingly minimize the portion of the fundamental mode in the beam. Similarly, feedback loop 280-3 may additionally be used to adjust the tunable optical phase mask 240 to minimize higher order modes when the tunable optical phase mask 240 is configured to pass the fundamental mode.

Data analyzer 260 may further be used to perform a power penalty calculation based on the data received from detector 250. This may be achieved by testing the DUT 230 with the tunable optical phase mask 240 set to pass the fundamental mode to measure the signal, and then by testing the same DUT 230 with the tunable optical phase mask 240 set to pass a higher order mode to measure the noise. Then a signal-to-noise determination for the MPI may be determined based on the level of fundamental mode (signal) and the level of higher order mode (noise). The power penalty due to MPI depends on the signal-to-noise ratio. In addition, an amount of interference may be acceptable for relatively lower data bit rate, such as a 100 Mbit signal modulated over the beam, but may be unacceptable for a higher data bit rate, such as a 40 Gbit modulated signal.

Accordingly, the resultant signal to noise ratio may be used as an input to a power budget analysis using factors including transmitter optical power, and detector optical sensitivity. As an example, a power budget may be calculated by computing a difference between minimum transmitter power launched into a fiber 102 and a minimum receiver sensitivity, where the minimum receiver sensitivity may be determined as a minimum amount of power necessary to maintain a required signal-to-noise ratio accounting for operating conditions such as attenuation loss. Based on the power penalty analysis and the MPI interference analysis, the data analyzer 260 may therefore determine whether a signal modulated at a desired bit rate will be able to traverse the DUT 230 while also producing acceptable results with a tolerable signal-to-noise ratio at the far end.

A data collector 270 may be connected to the data analyzer 260. The data collector 270 may be a database, and may be used store the collected data from detector 250 and data analyzer 260 for later analysis. The data collector 270 may store and make available for access the test results according to laser wavelength, bit rate, the specific DUT 230, among other factors. In some examples the data may be stored by data analyzer 260 without an external data collector 270.

In general, computing systems and/or devices, such as data analyzer 260, may employ any of a number of well known computer operating systems, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system. Examples of computing devices include, without limitation, a computer workstation, a server, a desktop, notebook, laptop, or handheld computer, or some other known computing system and/or device.

Computing devices generally include computer-executable instructions, where the instructions may be executable by one or more computing devices such as those listed above. Computer-executable instructions may be compiled or interpreted from computer programs created using a variety of well known programming languages and/or technologies, including, without limitation, and either alone or in combination, Java™, C, C++, Visual Basic, Java Script, Perl, Fortran, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium (also referred to as a processor-readable medium) includes any tangible medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores such as data collector 270 described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners, as is known. A file system may be accessible from a computer operating system, and may include files stored in various formats. An RDBMS generally employs the known Structured Query Language (SQL) in addition to a language for creating, storing, editing, and executing stored procedures, such as the PL/SQL language mentioned above.

In some examples, system elements such as data analyzer 260 and data collector 270 may be implemented in part as computer-readable instructions (e.g., software) on one or more computing devices (e.g., servers, personal computers, etc.), stored on computer readable media associated therewith (e.g., disks, memories, etc.).

Figure 3:
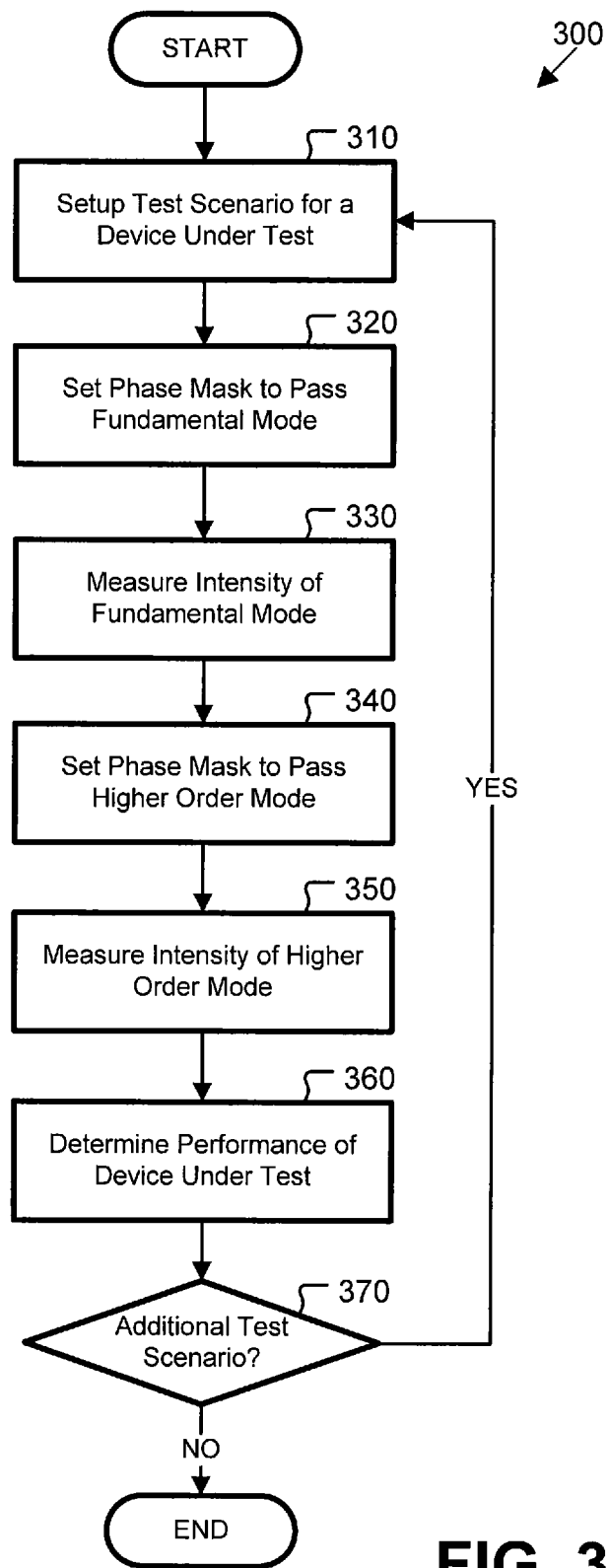
FIG. 3 illustrates an exemplary process flow for measuring a performance of a device under test accounting for multi-path interference.

FIG. 3 illustrates an exemplary process flow 300 for measuring signal-to-noise of a DUT 230 accounting for MPI. The process 300 may be performed in whole or in part by various systems, including but not limited to system 200.

In step 310, a test scenario for a DUT 230 is set up. The DUT 230 may be a device designed to mimic field installation conditions for optical fiber 102, or may be an installed line of fiber 102, such as a pulled fiber in a MDU or a portion of a submarine cable installation. One end of the DUT 230 may be coupled to polarization controller 220-1, and the other end of the DUT 230 may be coupled to polarization controller 220-2. Additionally, data analyzer 260 may set the tunable laser source 210 to a particular wavelength to test, activate the tunable laser source 210 so that the laser produces a laser beam, and set the polarization controller 220-1 to pass a desired orthogonal component of the laser beam received from tunable laser source 210. In other examples, one end of the DUT 230 may be coupled to a tunable laser source 210 and the other may be coupled to a tunable optical phase mask 240, without polarization controllers 220-1 and 220-2.

Next, in step 320, tunable optical phase mask 240 is set to pass the fundamental mode. For example, data analyzer 260 may set the tunable optical phase mask 240 to pass the fundamental mode through use of feedback loop 280-3. In some examples, the data analyzer 260 may perform an analysis on the received intensity data, determine a resonance frequency peak indicative of higher level modes being passed by the phase mask in addition to the fundamental mode, and send directives to the tunable optical phase mask 240 over the feedback loop 280-3 to adjust the settings of the tunable optical phase mask 240 to minimize the resonance frequency peak.

Next, in step 330, detector 250 measures the intensity of the fundamental mode. For example, data analyzer 260 may receive an output signal from detector 250 including information such as data regarding the intensity of the input beam. The received test data may be sent by the data analyzer 260 to the data collector 270 for storage.

Next, in step 340, tunable optical phase mask 240 is set to pass a higher order mode. For example, data analyzer 260 may set the tunable optical phase mask 240 to pass a higher order mode through use of feedback loop 280-3. In some examples, the data analyzer 260 may perform an analysis on the received intensity data, determine a resonance frequency peak indicative of the fundamental mode being passed by the phase mask in addition to the higher order mode, and send directives to the tunable optical phase mask 240 over the feedback loop 280-3 to adjust the settings of the tunable optical phase mask 240 to minimize the resonance frequency peak.

Next, in step 350, detector 250 measures the intensity of the higher order mode. For example, data analyzer 260 may receive an output signal from detector 250 including information such as data regarding the intensity of the input beam. The received test data may be sent by the data analyzer 260 to the data collector 270 for storage.

It should be noted that in some examples steps 320 and 330 are performed after steps 340 and 350. It should also be noted that in some examples steps 340 and 350 may be repeated to measure the intensity of additional higher order modes. In any event, once the test is completed, the data analyzer 260 may deactivate the tunable laser source 210.

Next, in step 360, data analyzer 260 determines the performance of the DUT 230. Data analyzer 260 may determine the performance based on data retrieved from data collector 270. For example, a signal-to-noise ratio for the DUT 230 may be determined based on the level of fundamental mode (signal) and the level of higher order mode or modes (noise) measured in steps 320 through 350 above for a particular laser wavelength. The resultant signal-to-noise ratio may be used as an input to a power budget analysis using factors including transmitter optical power, and detector optical sensitivity. This signal-to-noise information may provide greater information to the power budget analysis that a simple dB test that measures both signal and noise combined, because a signal-to-noise ratio may identify how much dynamic range is usable on the fiber given factors such as the transmitter optical power. Based on the power penalty analysis and the MPI interference analysis, the data analyzer 260 may further determine whether a signal modulated at a desired bit rate will be able to traverse the DUT 230 while also producing acceptable results with a reasonable signal-to-noise ratio at the far end.

Next, in step 370, it is determined whether another test is to be run. In some cases, the data analyzer 260 may run additional tests of the DUT 230 with different test parameters. For example, additional tests may be run to with different parameters for polarization controller 220-1 to test the travel of a different orthogonal component over the DUT 230. As another example, additional tests may be run to with different selected wavelengths for tunable laser source 210. If another test is to be run, step 310 is executed next. Otherwise, process 300 ends.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the invention is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising:
   a laser configured to produce a laser beam and to be optically coupled to a first end of an optical fiber of a device under test;
   a phase mask configured to selectively pass one of a plurality of modes and to be optically coupled to a second end of said optical fiber of said device under test;
   a detector optically coupled to said phase mask and configured to determine an intensity of said beam received over said optical connection from said phase mask; and
   a data analyzer connected to said detector and in selective communication with said phase mask, wherein said data analyzer is configured to:
   set said phase mask to selectively pass a fundamental mode,
   set said phase mask to selectively pass a higher order mode,
   receive intensity data from said detector,
   perform an analysis on said received intensity data,
   determine an analysis result indicative of an undesired mode being passed by said phase mask in addition to said mode said phase mask is set to selectively pass,
   send a directive to said phase mask to adjust settings of said phase mask to minimize said analysis result indicative of said undesired mode, and
   determine a performance in the form of at least one performance factor for said device under test according to said intensity data.

2. The system of claim 1, wherein said performance factor is a signal-to-noise ratio.

3. The system of claim 1, further comprising a data collector connected to said data analyzer and configured to store and retrieve data received from said data analyzer.

4. The system of claim 1, further comprising a polarization controller optically coupled between said laser and said device under test, whereby said polarization controller is configured to isolate one of two orthogonal components of said beam.

5. The system of claim 4, wherein said polarization controller is further configured to deterministically create a state of polarization specified by said data analyzer.

6. The system of claim 4, further comprising a second polarization controller optically coupled between said device under test and said detector, wherein said second polarization controller is configured to readjust said beam optically received from said device under test.

7. The system of claim 1, wherein said analysis includes performing a fast-Fourier transform analysis of said received intensity data, and wherein said analysis result includes a resonance frequency peak indicative of said undesired mode being passed by said phase mask.

8. The system of claim 1, wherein said mode said phase mask is set to selectively pass is said higher order mode, and said undesired mode is said fundamental mode.

9. The system of claim 1, wherein said mode said phase mask is set to selectively pass is said fundamental mode, and said undesired mode is a higher order mode.

10. The system of claim 1, wherein said laser is configured to allow for adjustment of the wavelength of the laser beam, and wherein said data analyzer is further configured to adjust said laser to produce a laser beam of a predetermined frequency.

11. A method, comprising:
    setting a phase mask to selectively pass a fundamental mode of a laser beam from a laser and exiting a device under test;
    receiving intensity data from a detector regarding the fundamental mode;
    setting the phase mask to selectively pass a higher order mode of the laser beam exiting the device under test;
    receiving intensity data from the detector regarding the higher order mode;
    performing an analysis on the received intensity data;
    determining an analysis result indicative of an undesired mode being passed by the phase mask in addition to the mode the phase mask is set to selectively pass; and
    sending a directive to the phase mask to adjust settings of the phase mask to minimize the analysis result indicative of the undesired mode; and
    determining at least one performance factor for the device under test according to the received intensity data.

12. The method of claim 11, wherein the performance factor is a signal-to-noise ratio.

13. The method of claim 11, further comprising setting the laser to produce a laser beam of a predetermined frequency.

14. The method of claim 11, further comprising:
    setting the phase mask to selectively pass a second higher order mode of the laser beam exiting the device under test; and
    receiving intensity data from the detector regarding the second higher order mode.

15. A non-transitory computer-readable medium tangibly embodying computer-executable instructions comprising:
    setting a phase mask to selectively pass a fundamental mode of a laser beam from a laser and exiting a device under test;
    receiving intensity data from a detector regarding the fundamental mode;
    setting the phase mask to selectively pass a higher order mode of the laser beam exiting the device under test;
    receiving intensity data from the detector regarding the higher order mode;
    performing an analysis on the received intensity data;
    determining an analysis result indicative of an undesired mode being passed by the phase mask in addition to the mode the phase mask is set to selectively pass; and
    sending a directive to the phase mask to adjust settings of the phase mask to minimize the undesired mode; and
    determining at least one performance factor for the device under test according to the received intensity data.

16. The computer-readable medium of claim 15, wherein the performance factor is a signal-to-noise ratio.

17. The computer-readable medium of claim 15, further comprising setting the laser to produce a laser beam of a predetermined frequency.

18. The computer-readable medium of claim 15, further comprising:
    setting the phase mask to selectively pass a second higher order mode of the laser beam exiting the device under test; and receiving intensity data from the detector regarding the second higher order mode.

19. The computer-readable medium of claim 15, wherein the mode said phase mask is set to selectively pass is the higher order mode, and the undesired mode is the fundamental mode.

20. The computer-readable medium of claim 15, wherein the mode said phase mask is set to selectively pass is the fundamental mode, and the undesired mode is a higher order mode.

* * * * *